United States Patent
Schuessler

(10) Patent No.: US 8,942,878 B2
(45) Date of Patent: Jan. 27, 2015

(54) METHOD FOR PROVIDING INFORMATION RELATING TO THE OPERATIONAL STATE OF A MOTOR VEHICLE TO A DRIVER AND MOTOR VEHICLE HAVING A CONTROL UNIT FOR CARRYING OUT THE METHOD

(75) Inventor: Martin Schuessler, Koesching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/235,929

(22) PCT Filed: Apr. 28, 2012

(86) PCT No.: PCT/EP2012/001837
§ 371 (c)(1),
(2), (4) Date: Jan. 29, 2014

(87) PCT Pub. No.: WO2013/017180
PCT Pub. Date: Feb. 7, 2013

(65) Prior Publication Data
US 2014/0195088 A1    Jul. 10, 2014

(30) Foreign Application Priority Data
Jul. 29, 2011   (DE) .......................... 10 2011 108 956

(51) Int. Cl.
| | |
|---|---|
| *B60L 11/00* | (2006.01) |
| *B60Q 1/54* | (2006.01) |
| *B60Q 5/00* | (2006.01) |
| *B60W 50/14* | (2012.01) |
| *B60K 35/00* | (2006.01) |

(52) U.S. Cl.
CPC ............... *B60Q 5/005* (2013.01); *B60W 50/14* (2013.01); *B60K 35/00* (2013.01); *B60W 2050/146* (2013.01); *B60W 2510/081* (2013.01); *B60W 2520/10* (2013.01); *B60W 2540/10* (2013.01)

USPC .......... 701/22; 180/65.1; 180/65.26; 340/438

(58) Field of Classification Search
None
See application file for complete search history.

(56) References Cited

U.S. PATENT DOCUMENTS 5,820,442 A * 10/1998 Helder .......................... 446/404
6,090,007 A *  7/2000 Nakajima et al. ............... 477/46
(Continued)

FOREIGN PATENT DOCUMENTS

| DE | 3822193 | 1/1990 |
|---|---|---|
| DE | 3832970 | 4/1990 |

(Continued)

OTHER PUBLICATIONS

German Office Action for German Patent Application No. 10 2011 108 956.3, issued May 5, 2014, 7 pages.

(Continued)

*Primary Examiner* — Calvin Cheung
*Assistant Examiner* — Krishnan Ramesh
(74) *Attorney, Agent, or Firm* — Staas & Halsey LLP

(57) ABSTRACT

A method provides information relating to the operational state of a motor vehicle to a driver. The motor vehicle has at least one electric motor operating with a fixed gear ratio for driving the motor vehicle. During operation of the electric motor a virtual speed and a virtual gear-shift stage are continuously determined from at least one first operating parameter describing the operational state of the motor vehicle and an acoustic output, in particular an output of an engine noise, takes place on the basis of the virtual speed and the virtual gear-shift stage.

22 Claims, 2 Drawing Sheets

(56) References Cited

U.S. PATENT DOCUMENTS

| | | | |
|---|---|---|---|
| 6,290,627 B1* | 9/2001 | Kusafuka et al. | 477/187 |
| 6,356,185 B1* | 3/2002 | Plugge et al. | 340/384.3 |
| 6,591,705 B1* | 7/2003 | Reik et al. | 74/343 |
| 7,979,147 B1* | 7/2011 | Dunn | 700/94 |
| 8,179,234 B1* | 5/2012 | Atwood | 340/384.3 |
| 8,537,030 B2* | 9/2013 | Perkins | 340/904 |
| 2002/0049118 A1* | 4/2002 | Vornehm et al. | 477/107 |
| 2004/0167761 A1* | 8/2004 | Sizov | 703/8 |
| 2006/0074645 A1* | 4/2006 | Tischer | 704/226 |
| 2008/0317257 A1* | 12/2008 | Furge et al. | 381/86 |
| 2009/0028353 A1* | 1/2009 | Kobayashi et al. | 381/61 |
| 2009/0149295 A1* | 6/2009 | Yamamoto et al. | 477/109 |
| 2009/0277707 A1* | 11/2009 | Ballard | 180/68.2 |
| 2010/0166210 A1* | 7/2010 | Isozaki | 381/86 |
| 2010/0256883 A1* | 10/2010 | Sauter | 701/65 |
| 2011/0010269 A1* | 1/2011 | Ballard | 705/26.41 |
| 2011/0085674 A1* | 4/2011 | Fujikawa | 381/86 |
| 2011/0087403 A1* | 4/2011 | Fujikawa | 701/36 |
| 2011/0093173 A1* | 4/2011 | Ideshio et al. | 701/55 |
| 2011/0202222 A1* | 8/2011 | Yamamoto | 701/22 |
| 2012/0106748 A1* | 5/2012 | Peachey et al. | 381/61 |
| 2013/0035817 A1* | 2/2013 | Bahar et al. | 701/22 |
| 2013/0208912 A1* | 8/2013 | Wiederwohl | 381/86 |
| 2013/0214921 A1* | 8/2013 | Meschke et al. | 340/467 |
| 2013/0230185 A1* | 9/2013 | Osawa et al. | 381/86 |
| 2013/0343570 A1* | 12/2013 | Orth | 381/86 |
| 2014/0004994 A1* | 1/2014 | Wang et al. | 477/4 |
| 2014/0016792 A1* | 1/2014 | Christoph | 381/61 |

FOREIGN PATENT DOCUMENTS

| | | |
|---|---|---|
| DE | 60301760 | 7/2006 |
| DE | 102006017634 | 10/2007 |
| DE | 102007060646 | 6/2009 |
| DE | 102008039481 | 2/2010 |
| DE | 102008040139 | 2/2010 |
| DE | 102011108956.3 | 7/2011 |
| DE | 102011108124 | 3/2012 |
| EP | 2202111 | 6/2010 |
| WO | 2008/069026 | 6/2008 |
| WO | 2011/005872 | 1/2011 |
| WO | 2011/050274 | 4/2011 |
| WO | PCT/EP2012/001837 | 4/2012 |

OTHER PUBLICATIONS

WIPO English Language Translation of International Preliminary Report on Patentability for PCT/EP2012/001837, downloaded from WIPO website Apr. 4, 2014, 11 pages.
English language International Search Report for PCT/EP2012/001837, mailed Aug. 30, 2012, 3 pages.
German Office Action for German Priority Patent Application No. 10 2011 108 956.3, issued Dec. 29, 2011, 7 pages.

* cited by examiner

METHOD FOR PROVIDING INFORMATION RELATING TO THE OPERATIONAL STATE OF A MOTOR VEHICLE TO A DRIVER AND MOTOR VEHICLE HAVING A CONTROL UNIT FOR CARRYING OUT THE METHOD

CROSS REFERENCE TO RELATED APPLICATIONS

This application is based on and hereby claims priority to International Application No. PCT/EP2012/001837 filed on Apr. 28, 2012 and German Application No. 10 2011 108 956.3 filed on Jul. 29, 2011, the contents of which are hereby incorporated by reference.

BACKGROUND

The invention relates to a method for providing information relating to the operational state of a motor vehicle to a driver, which motor vehicle comprises at least one electric motor operating with a fixed transmission ratio for driving the motor vehicle.

In modern motor vehicles, for example hybrid motor vehicles or electric vehicles, electric motors are used which drive the motor vehicle with a fixed transmission ratio. An electric motor can cover the total desired speed range here, for example, in a rotational speed range of 0 to 12 000 rpm.

In order to communicate the operational state of the electric motor to the driver, what are referred to as "power meters" have been proposed which operate together with a speed display (tachometer), for example on a combination display device. The power meter displays as a function of an operational variable of the electric motor, for example as a function of the actual rotational speed thereof, a value which is not specified in more detail but which, however, for a driver who is accustomed to a manual shift or automatic transmission, is, on the one hand, unfamiliar and difficult to understand, but, on the other hand, can also be difficult to interpret if it is considered that an electric motor has, at low rotational speeds, a rather poor efficiency and an improved efficiency is then usually only achieved at relatively high rotational speeds and/or relatively high speeds.

SUMMARY

One possible object is specifying a method which gives the customer improved feedback on the operational state of the motor vehicle, in particular intuitively comprehensible feedback.

In order to achieve this object, the inventor proposes a method of the type specified at the beginning. During operation of the electric motor a virtual rotational speed and a virtual shift stage are continuously determined from at least one first operational parameter describing the operational state of the motor vehicle, and an acoustic output, in particular an output of an engine noise, takes place as a function of the virtual rotational speed and the virtual shift stage.

In order to give the customer better feedback on the driving state in the case of a motor vehicle with an electric motor, it is consequently proposed to convert the actual operational state, described by at least one first operational parameter, into a virtual rotational speed and a virtual shift stage, consequently a concept which is already known to the driver from types of motor vehicle having a changing transmission ratio, that is to say different driving stages. For example, the behavior of an automatic transmission can be simulated. If, a corresponding acoustic output, that is to say a specific noise range, is generated, in particular also a change in a virtual shifting operation is generated, the driver can particularly advantageously "listen in" to the motor vehicle operated by the electric motor, which means the operational state which the motor vehicle is in becomes acoustically ever clearer to the driver over time. Here, engine noises inside and/or outside the motor vehicle are particularly advantageously generated by corresponding acoustic output device, in particular loudspeakers. As a result, noise ranges are assigned to the operational states, but at least to their sequence, which noise ranges the driver recognizes and interprets over time. In particular, the driver is informed without having to direct his gaze at instruments, since drivers frequently also drive by ear. Consequently, a pleasant, reproducible electric driving noise is generated which is based on the engine noises in the case of a switching transmission, in particular an automatic transmission, in that a virtual rotational speed and a virtual shift stage are determined and considered.

The proposed method is particularly advantageously used in electric vehicles, but can also be applied in hybrid vehicles in which the electric motor is coupled by a fixed, that is to say invariable transmission ratio.

In addition, the virtual rotational speed can preferably be displayed visually, in particular in the form of a rev counter, and/or the virtual shift stage can be displayed visually. Consequently, it is possible to display, for example on a combination display device, not only a tachometer but also, as is known, in particular, from motor vehicles with an internal combustion engine, a rev counter which informs the driver of the virtual rotational speed. The shift stage can correspondingly also be displayed, for example, adjacent to the rev counter and/or in a way which is integrated therein. In the case of a rev counter it is consequently possible, for example, to adapt the pointer position as a function of the specific virtual rotational speed. The range in which the specific virtual rotational speed can lie can lie, for example, between 0 and 9000 rpm. This improves the feedback on the operational state further since the driver can transfer the known concepts in the case of a motor vehicle whose gear is to be shifted, in particular an automatic motor vehicle, to the motor vehicle operated by the electric motor, and finds corresponding playback, both acoustic and visual.

In a specific refinement it is possible to provide that the current rotational speed of the electric motor and/or the current speed of the motor vehicle and/or the position of the accelerator pedal are considered as operational parameters for determining the virtual rotational speed and the virtual shift stage. All three of these first operational parameters are particularly advantageously considered. These operational parameters describe the current operational state of the motor vehicle with sufficient precision and ultimately also the driver's request by the position of the accelerator pedal. However, of course, other first parameters, for example the current power consumption of the electric motor or the like, which can be considered, are also conceivable.

In a further development it is possible to provide that at least one characteristic diagram and/or the time profile of at least one of the operational parameters are/is taken into account in the determination of the virtual rotational speed and of the virtual shift stage. While it is basically conceivable to use just one characteristic diagram in which each set of first operational parameters is assigned a specific virtual operational state, consequently a specific virtual shift stage and a virtual rotational speed, it is preferred according to the invention if the dynamics of a shift behavior are also simulated over the time profile of at least one of the first operational parameters, for example in turn an automatic transmission is modeled since in this way further information can be communicated to the driver. In a further refinement it is therefore conceivable, for example, that each virtual shift stage is assigned a characteristic diagram which assigns a virtual rotational speed to the current first operational parameters. In addition to these characteristic diagrams, virtual shift conditions are to be provided which can also take into account the profile of the first operational parameters and therefore ultimately switch over between the virtual shift stages and therefore also the characteristic diagrams.

As already mentioned, it is particularly preferred if the shift behavior of an automatic transmission is modeled by the virtual rotational speed and the virtual shift stage. It is therefore possible to provide, for example, that after a virtual rotational speed which exceeds a threshold value is held in a tolerance range for a predetermined time period, the virtual shift stage is increased and the virtual rotational speed is reduced. In this way, a shift process of an automatic transmission can be simulated after an acceleration phase. If, for example in the fourth virtual shift stage, the rotational speed is accelerated up to 8000 virtual rpm and then this is held for a predetermined time period, for example for 2 to 8 seconds, it is possible to change then into a virtual sixth gear speed and the virtual rotational speed can be reduced to 4000 rpm. These virtual shift processes are correspondingly displayed acoustically and, if appropriate, also visually and can therefore be experienced by the driver. Of course, other scenarios are also conceivable in which such a shift behavior of an automatic transmission is reproduced, for example the shifting down in the case of a low virtual rotational speed and an accelerator pedal which is depressed to a great extent. This can be particularly advantageously used in connection with a refinement in which the virtual parameters are combined with a specific actuation which takes them into account, wherein then ultimately it is possible to ensure that the information content of the virtual rotational speed and of the virtual shift stage—transmitted, of course, by the driver—is also converted into corresponding consequences, for example with respect to the efficiency of the motor vehicle, more details on which will be given below. In any case, such mapping of the shift behavior of an automatic transmission can be achieved particularly expediently with the implementation already mentioned in which characteristic diagrams for the various virtual shift stages are provided together with shift conditions which can also be based on the history of the operational parameters.

In one particularly advantageous refinement it is possible to provide that at least one vehicle system is actuated as a function of the virtual rotational speed and/or of the virtual shift stage and/or of the time profile of the virtual rotational speed and/or of the virtual shift stage. The method can clearly be influenced by vehicle systems as a function of the virtual rotational speed and of the virtual shift stage, for example in order to also actually implement a behavior which is intuitively expected by the driver in an operational state which corresponds to the virtual parameters, with the result that the experience of the driver in this respect can also be transferred to the motor vehicle operated with the electric motor. On the other hand, the actuation of the vehicle systems allows the information provided to the driver to be improved.

It is therefore possible, for example, to provide that when there is a change in the virtual shift stage a longitudinal jolt of the motor vehicle, which can be perceived by the driver, is generated, in particular by a brief reduction in the actual rotational speed of the electric motor. In the case of a changeover of the virtual shift stage, the driver is then also given haptic feedback, which is ultimately expected by him and which ideally does not adversely affect the driving comfort, and nevertheless it carries the clear information that the virtual shift stage has just been changed. In this context it is appropriate to implement this by actuating the electric motor, but other systems can also be briefly actuated, for example a brake system and/or an active chassis system if this also permits the generation of longitudinal jolts. Ultimately, the shift jolt is also modeled in this refinement.

In a further, particularly advantageous exemplary embodiment it is possible to provide that at least one power limit of the electric motor is set or canceled as a function of the virtual rotational speed and/or of the virtual shift stage and/or of the time profile of the virtual rotational speed and/or of the virtual shift stage. By building, for example, on the example already illustrated above in which acceleration and the virtual shifting up from a fourth into a sixth gear speed took place, a relatively low virtual rotational speed is thus obtained. The driver then has the impression of driving more efficiently. Electric motors usually have a specific working range in which a particularly high efficiency level is provided. If the maximum power level is required of the electric motor, the efficiency level frequently drops suddenly. It is conceivable within the scope of the method to limit the operation of the electric motor, for example when specific threshold rotational speeds, in particular dependent on the virtual component stage, are undershot, in such a way that a threshold value for the efficiency cross section is not undershot, for example therefore remains in an optimum working range. The efficiency, the impression of which is communicated to the driver, is consequently actually implemented. If the driver desires stronger acceleration or the like, virtual shifting is, of course, carried out in any case by the shift conditions, for example into a relatively low gear speed again, with the result that the power limit on the electric motor, which is implemented or set here, is canceled again. Of course, other scenarios are also conceivable in which such reconciliation between the expected behavior of the driver and the actual behavior of the motor vehicle is brought about.

In this context it is also particularly advantageous if the determination of the virtual rotational speed and of the virtual shift stage is modified jointly with limitation and/or expansion of the operational states of the electric motor, as a function of at least one further operational parameter which describes the operational state of the motor vehicle. In this case, for example by specific operational states of the motor vehicle it is possible also to inform the driver about already existing limitations by the virtual rotational speed and the virtual shift stage and make them plausible for him. For example, it is conceivable here that the state of charge of a battery supplying the electric motor is used as a further operational parameter. Motor vehicles which are operated by an electric motor can be placed, for example in the case of a low state of charge of the electric energy accumulator which supplies the electric motor, in another operational state in which as far as possible the vehicle is driven in an energy-saving fashion, for example the electric motor can be operated only within a predefined range, in particular an optimum working range. Then, for example strong accelerations and the like are, under certain circumstances, no longer possible. If, for example, the driver requests a strong acceleration before an overtaking maneuver, he can also be informed of the limitation of the operation owing to the low residual energy by virtue of the fact that the visual shifting down which he expects does not in fact take place but instead the transmission remains in a high gear speed at a low virtual rotational speed (that is to say an efficient driving style).

In this case, the shift conditions already mentioned above could therefore be modified or the like, for example given a limitation of the operational state of the electric motor.

In a further refinement of the concept it is possible to provide that at least one parameter which can be set on the driver's side, in particular an operating mode and/or a regeneration value, is taken into account during the determination of the virtual rotational speed and the virtual shift stage and/or the acoustic output.

It is consequently conceivable that the way in which the virtual parameters or the information is determined is made dependent on various driver interfaces, for example on an operating mode (for example sport, economy or comfort) which is set or a regeneration stage which is set, which can be implemented, for example, by rocker switches on the steering wheel. An overall package which is matched to the current operating mode of the motor vehicle and which corresponds to the driver's expectations for this operating mode is correspondingly offered.

At this point it is also to be noted that, depending on the type of the motor vehicle under consideration, it is also possible to provide in each case individual acoustic outputs ("sound packages") which are typical of the type of motor vehicle and which can be coupled to the visual display, which is provided, if appropriate. It is therefore possible, in the case of a town vehicle, that a different noise range will be desired and expected than in the case of a sports car or the like. Furthermore, it is also conceivable to make it possible that the acoustic output and/or the determination of the virtual shift stage and the virtual rotational speed can be configured differently by a driver, for example in that corresponding sound packages or total packages, which are made available, for example, on the Internet, are input into the motor vehicle.

In addition to the method, the inventor also proposes a motor vehicle comprising at least one electric motor which operates with a fixed transmission ratio to drive the motor vehicle, at least one acoustic output device and a control device which is designed to carry out the method. All the embodiments relating to the method can be transferred analogously to the motor vehicle and also permit the already specified advantages to be obtained.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
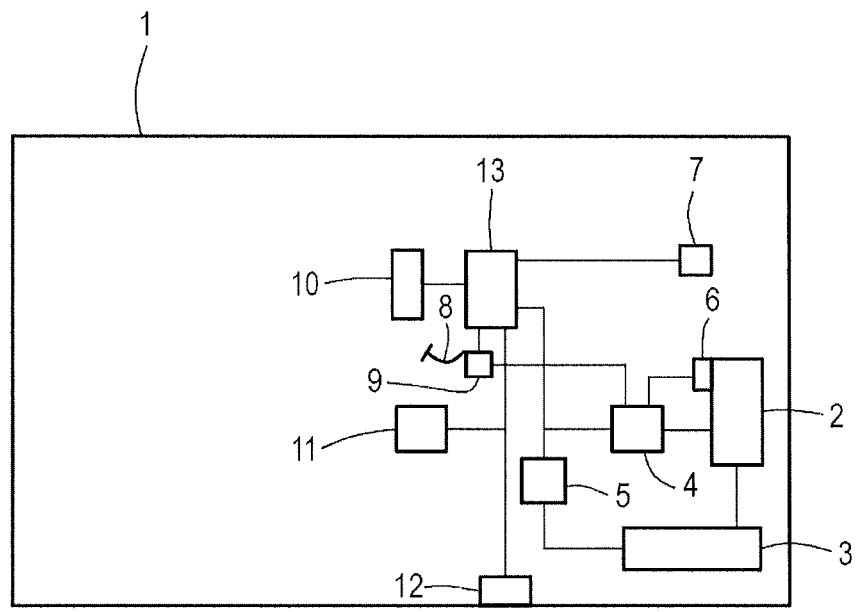
FIG. 1 shows a basic outline of a proposed motor vehicle.

Reference will now be made in detail to the preferred embodiments, examples of which are illustrated in the accompanying drawings, wherein like reference numerals refer to like elements throughout.

FIG. 1 shows a basic outline of a motor vehicle 1. The motor vehicle 1 is a motor vehicle with an electric motor 2, specifically in the present exemplary embodiment an electric vehicle. The electric motor 2 drives at least one wheel (not illustrated in more detail) of the motor vehicle 1 with a fixed, that is to say invariable transmission ratio, in order to propel said motor vehicle 1. A high voltage battery 3 is provided as an energy accumulator for the electric motor 2. Both the electric motor 2 and the high voltage battery 3 are each assigned a control unit 4, 5. The rotational speed of the electric motor 2 can be measured by a corresponding rotational speed sensor 6. A further sensor 7 measures the current speed of the motor vehicle 1.

The electric motor 2 is also actuated as a function of the activation of an accelerator pedal 8, to which a sensor 9, which measures the position of the accelerator pedal, is also assigned.

In order to provide the driver with information about the operational state of the motor vehicle, the motor vehicle 1 also comprises a combination display device 10 (also frequently referred to as a combination display) as well as acoustic devices 11, 12 which are capable of acoustically outputting the operational state of the motor vehicle 1 in the form of artificial engine noise. The operation of the combination display device 10 and of the acoustic output devices 11, 12 is controlled by a control unit 13, which is also designed to carry out the method.

This means that the control unit 13 in the present exemplary embodiment is designed to determine a virtual rotational speed and a virtual shift stage by taking into account the current rotational speed of the electric motor 2, the current speed of the motor vehicle 1 and the position of the accelerator pedal 8 as first operational parameters, wherein the shift behavior of an automatic transmission is modeled. The control unit 13 generates a visual display of the virtual rotational speed and of the virtual shift stage on the combination display device 10, and an acoustic output, here an output of an engine noise, at the acoustic output devices 11, 12.

Figure 2:
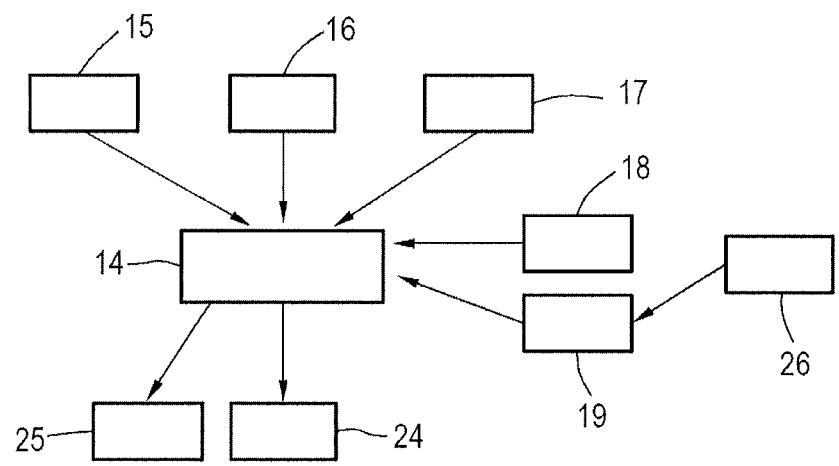
FIG. 2 shows a sequence chart of the proposed method.

This will be explained once more in more detail by the sequence chart of the method in FIG. 2. Here it is emphasized once more that the illustration in FIG. 2 is merely an exemplary embodiment; of course, other implementations of the specific calculation and use of the virtual rotational speed and of the virtual shift stage are conceivable, in particular other dependencies and calculation rules.

If the current virtual rotational speed and the current virtual shift stage are calculated in 14, consequently first operational parameters, here the vehicle speed 15, the rotational speed 16 of the electric motor 2 and the position 17 of the accelerator pedal are input as basic input values. Firstly, characteristic diagrams 18 are now stored, specifically for each virtual shift stage, in a memory device inside the control unit 13, wherein, for example, six virtual shift stages can be provided, wherein each characteristic diagram connects at least some of the first operational parameters to a virtual rotational speed. Which virtual shift stage and therefore which virtual rotational speed are determined at the end depends on shift conditions 19 which can also be stored in the memory device of the control unit 13. These shift conditions take into account not only the current value of the first operational parameters 15, 16 and 17 but also their time profile, which is stored for this purpose in the control unit 13. Both the characteristic diagrams 18 and the shift conditions 19 are selected here in such a way that the shift behavior of an automatic transmission is modeled.

Figure 3:
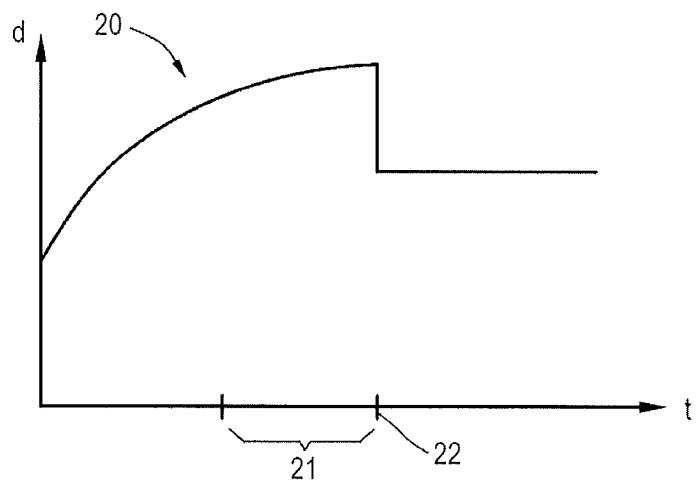
FIG. 3 shows the possible time profile of the virtual rotational speed and of the virtual shift stage.
Figure 3:
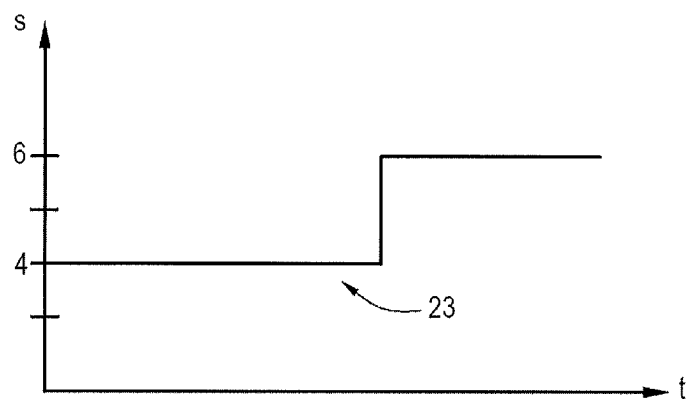

An example of the profile of the virtual parameters, that is to say of the virtual shift stage and of the virtual rotational speed, is illustrated in FIG. 3 for the case that a driver on the freeway accelerates strongly up to a specific speed. Then, the position 17 of the accelerator pedal, the speed 15 and the rotational speed 16 hardly change. Correspondingly, the virtual rotational speed, profile 20, also remains constant at first.

If no change which exceeds a tolerance range takes place within a predetermined time period 21, for example 3 seconds here, at a time 22 the virtual sixth shift stage is shifted into, as is apparent from the profile 23. Correspondingly, the virtual rotational speed drops, profile 20. This means that the virtual rotational speed and the virtual shift stage behave here as the driver would also expect from an automatic transmission. In order to be able to effectively accelerate, operation is initially carried out in a low gear at high rotational speeds until a desired target speed is reached by the driver, after which shifting up is performed in order to drive more efficiently and consequently the rotational speed is reduced, with the result that the motor vehicle 1 also runs more quietly.

If the driver strongly depresses the accelerator pedal 8 again later, it is possible, for example, to shift down and the like, in a simulation of the automatic transmission. This arises correspondingly from the shift conditions 19. The virtual rotational speed which is determined and the virtual shift stage which is determined are used, in 24 in the exemplary embodiment shown in FIG. 2, not only to provide the driver with information about the operational state of the motor vehicle 1 by the combination display device 10 and the acoustic output devices 11, 12 but also changed actuation of the electric motor 2 takes place in 25, specifically in that, given specific values of the virtual rotational speed and of the virtual shift stage, limits are set relating to the operation thereof, which limits can be canceled again when other virtual shift stages and virtual rotational speeds are present. The efficiency behavior of an automatic transmission can therefore be simulated.

It is therefore possible to provide that whenever a specific virtual rotational speed is undershot in specific virtual shift stages, a specific efficient operating range in which, for example, the efficiency level exceeds a predetermined limiting value is not exited. In this way, the expected behavior of the driver is simulated. This is because if a high shift stage is displayed at a low rotational speed, the driver assumes that the vehicle 1 is driving extremely efficiently. A limitation in the driving behavior of the driver is not connected to this since the shift conditions of course inevitably provide, for example when opening the throttle, that a virtual shift process takes place and the limitation is consequently canceled again.

However, the electric motor 2 can also be actuated in another way in 25, specifically in order to provide a shift jolt whenever a changeover of the virtual shift stage has taken place. Specifically it is possible to provide for this purpose, in brief to reduce slightly the rotational speed of the electric motor 2 with the result that a longitudinal jolt is generated in the motor vehicle 1, which jolt gives the driver an indication of the virtual shift stage changeover which has taken place, without, however, adversely affecting his comfort. In this way, the information provided to the driver can be improved further.

Overall, the method therefore makes it possible to provide information about the operational state of the motor vehicle 1 which is more differentiated, can be learnt better and is intuitive. Since basically known processes are simulated to the driver by the simulation of the automatic transmission, he can, for example as far as the acoustic output is concerned, easily "listen in" to the behavior of the motor vehicle 1, with the result that he can also estimate the operational state which the motor vehicle 1 is currently in without looking at the combination display device 10 or other display device.

At this point it is also to be noted that the method can also be used to take into account changes of further operational parameters which entail, for example, limitations during the operation of the motor vehicle 1. Here, it is provided, for example, that when a predetermined amount of residual energy in the high voltage battery 3 is undershot, the electric motor 2 can then be operated only in a specific limited working range, for example in turn in a working range in which the efficiency level exceeds the threshold value or a threshold value. The information 26 about the residual energy can then also be used to modify the shift conditions 19 in such a way that, for example, no virtual shifting down takes place anymore, which intuitively explains this slower acceleration to the driver.

This is particularly advantageous if in 25 the described limitation on the operation of the electric motor 2 is set in any case, since then the method is already completely sufficient basically to set this restriction. If, according to the current shift conditions 19, shifting back does not in fact take place, limitations are not canceled and the electric motor 2 is inevitably operated efficiently without the need for a further functionality.

At this point it is also to be noted that in addition to exerting influence by the state of charge of the high voltage battery 3 (information 26), it is also possible to provide a dependence of the determination in 14 or of the outputting in 24 on parameters which can be set on the driver's side as a further, i.e. second operational parameter. For example, the generated engine noise and the behavior described by the shift conditions 19 and the characteristic diagrams 18 can be configured differently as a function of an operating mode which is set for the motor vehicle 1, for example in that in a sporty operating mode which is set it is possible to shift earlier and more quickly in a virtual fashion and louder engine noise is generated, while the engine noise in a comfort operating mode can be reproduced in a more quiet way and gentle shifting can take place. The regeneration value which can be set, for example, by a rocker switch on the steering wheel is also cited as a further parameter which can be set on the driver's side and which can influence the determination of the virtual shift stage and of the virtual rotational speed or the outputting.

However, it is also conceivable even to permit the driver to store and select different "sound packages" in the control unit 13.

Figure 4:
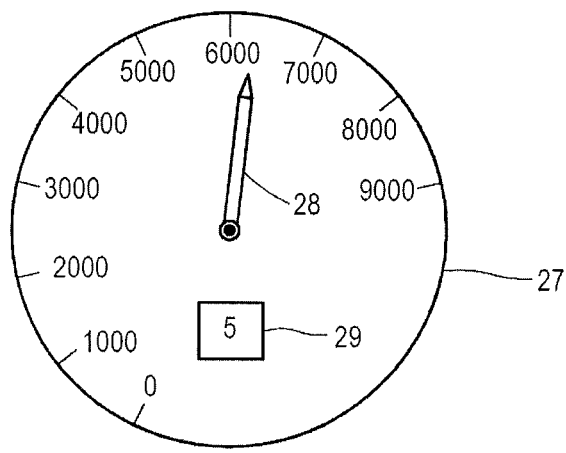
FIG. 4 shows a possible visual display within the scope of the proposal.

Finally, FIG. 4 shows an exemplary possibility for the visual display of the virtual rotational speed and of the virtual shift stage on the combination display device 10. Here, a rev counter 27 is shown on which the rotational speed can be read by the position of a pointer 28. The current virtual shift stage is displayed in an information field 29 which is integrated into the rev counter 27. Consequently, the impression of the virtual automatic transmission can also be completed visually.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for providing information to a driver relating to an operational state of a motor vehicle having an electric motor to drive the motor vehicle with a fixed transmission ratio, comprising:

during operation of the electric motor, continuously determining a virtual rotational speed and a virtual gear-shift stage from a first operational parameter describing the operational state of the motor vehicle;

limiting or expanding a predefined range of operating states of the electric motor within which the electric motor can be operated, as a function of a second operational parameter describing the operational state of the motor vehicle, the second operational parameter being different from the first operational parameter;

modifying, by a control unit, the virtual rotational speed and the virtual gear-shift stage to produce a virtual modified rotational speed and a virtual modified gear-shift stage, the virtual rotational speed and the virtual gear-shift stage being modified as a function of the second operational parameter; and producing an acoustic output as a function of the virtual modified rotational speed and the virtual modified gear-shift stage.

2. The method as claimed in claim 1, further comprising visually displaying at least one of the virtual modified rotational speed and the virtual modified gear-shift stage.

3. The method as claimed in claim 1, wherein
the first operational parameter is at least one parameter selected from the group consisting of a current rotational speed of the electric motor, a current speed of the motor vehicle and a position of an accelerator pedal.

4. The method as claimed in claim 1, wherein
the virtual rotational speed and the virtual gear-shift stage are determined from a plurality of first operational parameters, and
the first operational parameters comprise a position of an accelerator pedal and at least one parameter selected from the group consisting of a current rotational speed of the electric motor and a current speed of the motor vehicle.

5. The method as claimed in claim 1, wherein at least one characteristic diagram and/or the time profile of at least one of the operational parameters are/is taken into account in the determination of the virtual modified rotational speed and of the virtual modified gear-shift stage.

6. The method as claimed in claim 1, wherein
the virtual modified rotational speed and the virtual modified gear-shift stage are produced using a plurality of characteristic diagrams and a time profile,
each characteristic diagram considers at least one of the operational parameters for a different gear shift stage, and
the time profile determines changes in gear shift stages.

7. The method as claimed in claim 5, wherein a shift behavior of an automatic transmission is modeled by the virtual modified rotational speed and the virtual modified gear-shift stage.

8. The method as claimed in claim 1, wherein a vehicle system is actuated as a function of the virtual modified rotational speed and/or of the virtual modified gear-shift stage.

9. The method as claimed in claim 8, wherein when there is a change in the virtual gear-shift stage, the vehicle system is actuated to generate a longitudinal jolt of the motor vehicle, which can be perceived by the driver.

10. The method as claimed in claim 9, wherein the longitudinal jolt is dependent upon a time profile of the virtual gear-shift stage to thereby consider a starting gear and an ending gear in the change in the virtual gear-shift stage.

11. The method as claimed in claim 9, wherein the vehicle system is selected from the group consisting of a braking system, an electric motor system and an active chassis system.

12. The method as claimed in claim 1, wherein at least one power limit of the electric motor is set or cancelled as a function of the virtual modified rotational speed and/or of the virtual modified gear-shift stage.

13. The method as claimed in claim 1, wherein if an accelerator pedal senses no acceleration for a predetermined period of time, the virtual modified rotational speed and the virtual modified gear-shift stage simulate up-shifting.

14. The method as claimed in claim 1, wherein if the accelerator pedal senses no acceleration for a predetermined period of time, the virtual modified rotational speed and the virtual modified gear-shift stage simulate up-shifting and a limit is placed on additional power being supplied to the electric motor.

15. The method as claimed in claim 1, wherein the second operational parameter is a state of charge of a battery which supplies the electric motor.

16. The method as claimed in claim 15, wherein a simulated downshifting is prevented when there a battery charge is lower than a predetermined charge level.

17. The method as claimed in claim 1, wherein at least one parameter which can be set on the driver's side is taken into account during determining the virtual rotational speed and the virtual gear-shift stage and/or the acoustic output.

18. The method as claimed in claim 1, wherein the acoustic output simulates a typical motor vehicle engine noise.

19. The method as claimed in claim 18, wherein the acoustic output is produced based on a sound package selected by the driver.

20. The method as claimed in claim 18, wherein when a sport mode is selected by the driver, the acoustic output simulates louder engine noises and the virtual modified rotational speed and the virtual modified gear-shift stage simulate shifting earlier and more quickly.

21. The method as claimed in claim 18, wherein when a comfort mode is selected by the driver, the acoustic output simulates quieter engine noises and the virtual modified rotational speed and the virtual modified gear-shift stage simulate smoother shifting.

22. A motor vehicle, comprising:
an electric motor which operates with a fixed transmission ratio to drive the motor vehicle;
an acoustic output device; and
a control device to provide information to a driver relating to an operational state of a motor vehicle, to:
continuously determine, during operation of the electric motor, a virtual rotational speed and a virtual gear-shift stage from a first operational parameter describing the operational state of the motor vehicle;
limit or expand a predefined range of operating states of the electric motor within which the electric motor can be operated, as a function of a second operational parameter describing the operational state of the motor vehicle, the second operational parameter being different from the first operational parameter;
modify the virtual rotational speed and the virtual gear-shift stage to produce a virtual modified rotational speed and a virtual modified gear-shift stage, the virtual rotational speed and the virtual gear-shift stage being modified as a function of the second operational parameter; and
produce an acoustic output as a function of the virtual modified rotational speed and the virtual modified gear-shift stage.

* * * * *